US011482341B2

(12) United States Patent
Mandal et al.

(10) Patent No.: US 11,482,341 B2
(45) Date of Patent: Oct. 25, 2022

(54) SYSTEM AND A METHOD FOR UNIFORMLY CHARACTERIZING EQUIPMENT CATEGORY

(71) Applicant: Carrier Corporation, Palm Beach Gardens, FL (US)

(72) Inventors: Subhasis Mandal, Bangalore (IN); Yogesh B, Bangalore (IN); Somesh Bandari Gopalaiah, Bangalore (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/122,350

(22) Filed: Dec. 15, 2020

(65) Prior Publication Data
US 2021/0350941 A1 Nov. 11, 2021

(30) Foreign Application Priority Data
May 7, 2020 (IN) .............................. 202011019422

(51) Int. Cl.
*H04L 29/08* (2006.01)
*G16Y 20/20* (2020.01)
(Continued)

(52) U.S. Cl.
CPC .............. *G16Y 20/20* (2020.01); *G16Y 30/00* (2020.01); *G16Y 40/10* (2020.01); *G16Y 40/60* (2020.01); *H04L 65/61* (2022.05); *H04L 67/12* (2013.01)

(58) Field of Classification Search
CPC ........ G16Y 30/00; G16Y 40/10; G16Y 20/20; G16Y 40/60; H04L 65/4069; H04L 67/12
See application file for complete search history.

(56) References Cited

U.S. PATENT DOCUMENTS

| 7,403,869 B2 | 7/2008 | Wegerich et al. |
| 9,262,255 B2 | 2/2016 | Hampapur et al. |

(Continued)

FOREIGN PATENT DOCUMENTS

CN 109547479 A 3/2019

OTHER PUBLICATIONS

US 10,346,932 B2, 07/2019, Ghosh et al. (withdrawn)

*Primary Examiner* — Kim T Nguyen
(74) *Attorney, Agent, or Firm* — Cantor Colburn LLP

(57) ABSTRACT

Aspects of the invention are directed towards a system and a method for uniformly characterizing equipment category. One or more embodiments of the invention describe the method comprising steps of extracting a plurality of data points from data stream received from a plurality of equipment within an equipment category. The method also comprises steps of normalizing the varying frequency of the extracted data points to generate time normalized information corresponding to each of the plurality of equipment. The method comprises steps of manipulating a plurality of variances in the translated uniform data stream received from each of the plurality of equipment within the equipment category. The method comprises steps of generically mapping the normalized information to one or more aggregation methods and for mapping the output of aggregation methods to one or more reusable data processing algorithms to generate a plurality of uniform equipment characteristics corresponding to the equipment category.

5 Claims, 3 Drawing Sheets

(51) Int. Cl.
*H04L 67/12* (2022.01)
*G16Y 40/10* (2020.01)
*G16Y 40/60* (2020.01)
*G16Y 30/00* (2020.01)
*H04L 65/61* (2022.01)

(56) References Cited

U.S. PATENT DOCUMENTS

| | | |
|---|---|---|
| 9,311,615 B2 | 4/2016 | Davenport et al. |
| 9,665,843 B2 | 5/2017 | Smiley et al. |
| 9,690,312 B2 | 6/2017 | Steven et al. |
| 10,210,037 B2 | 2/2019 | Flyax |
| 10,241,505 B2 | 3/2019 | Cohen et al. |
| 10,359,748 B2 | 7/2019 | Elbsat et al. |
| 10,417,076 B2 | 9/2019 | Ciasulli et al. |
| 2002/0082966 A1 | 6/2002 | O'Brien et al. |
| 2015/0120346 A1 | 4/2015 | Byrne et al. |
| 2018/0039238 A1 | 2/2018 | Gartner et al. |
| 2018/0284735 A1* | 10/2018 | Cella ............... G05B 23/0229 |
| 2019/0155941 A1 | 5/2019 | Bhide et al. |
| 2020/0162354 A1* | 5/2020 | Drees ............... H04L 41/0645 |

* cited by examiner

SYSTEM AND A METHOD FOR UNIFORMLY CHARACTERIZING EQUIPMENT CATEGORY

CROSS-REFERENCE TO RELATED APPLICATIONS

This application claims priority to Indian Patent Application No. 202011019422, filed May 7, 2020, the contents of which are incorporated by reference herein in their entirety.

BACKGROUND

The present invention generally relates to IOT solutions for managing equipment and buildings. More particularly, the invention relates to a system and a method for uniformly characterizing equipment category for a plurality of equipment located in a building/site to determine behavior of equipment for end usage.

Sites, both residential and industrial, have a plurality of equipment such as chillers, air-conditioners etc. Such equipment offer similar services but are manufactured by different manufacturers, have different models and sizes. Hence data/information from these equipment varies considerably. This can be attributed to varying operating conditions, end usage requirement, installation location, weather and/or changes in hardware or software being used in the equipment. Due to high variances in the data from these equipment, it is difficult to generalize the operating data received from these equipment. The advantage of generalization of data from equipment is that it helps in representing the equipment and/or characteristics of the equipment. Further, generalization of data can be performed only by collecting all the data from the equipment which belong to the same category.

Data generalization in the existing solutions involves manual intervention to identify particular behavior of any equipment which is time consuming and requires considerable manual efforts. Also, the data generalization using the existing solutions often leads to loss of important information which does not result in correct, proper and effective representation of the equipment and/or characteristics of the equipment. In addition, the existing solutions work based on reactive action based on the particular behavior of an equipment rather than as a pre-emptive action.

In view of the afore-mentioned problems in the existing solutions, there is a need of an effective system and a method for generalizing data from equipment to represent the equipment and/or characteristics of the equipment. There is also a requirement to automatically generalize the data received from the equipment. In order to solve the problems in the existing solutions, a system and a method are disclosed.

SUMMARY

Various embodiments of the invention describe a system for uniformly characterizing equipment category. The system comprises an information extraction module configured to extract a plurality of data points from data stream received from a plurality of equipment within an equipment category. Also, the data stream received from each of the plurality of equipment is uniformly translated before providing as input to the information extraction module. The system also comprises a frequency decoupling module configured to normalize the varying frequency of the extracted data points to generate time normalized information corresponding to each of the plurality of equipment in the equipment category. The system further comprises a variance handling module configured to manipulate a plurality of variances in the translated uniform data stream received from each of the plurality of equipment within the equipment category. The system also comprises a generalized mapping module configured to generically map the normalized information to one or more aggregation methods and for mapping the output of aggregation methods to one or more reusable data processing algorithms to generate a plurality of uniform equipment characteristics corresponding to the equipment category.

In an embodiment of the invention, the frequency decoupling module is further configured to generate the normalized information at one or more pre-defined frequencies.

In another embodiment of the invention, the plurality of variances in the translated uniform data stream are by virtue of technology, vendor, make, model and version of the plurality of equipment.

In yet another embodiment of the invention, the generated uniform equipment characteristics represent different synchronous frames of received data stream in time domain for determining and benchmarking equipment behavior, equipment usage pattern and interaction simulations.

In an embodiment of the invention, the system also comprises a user reference module configured to enhance the generated uniform equipment characteristics by comparing the normalized information corresponding to each of the plurality of equipment with a reference input configured by a user to isolate the impact of user preferences from a plurality of base characteristics of each of the plurality of equipment. Also, the reference input comprises a plurality of policies and references that define objective of the user. The base characteristics are common characteristics of the equipment category for which it is designed by one or more manufacturers of the same equipment category.

In a different embodiment of the invention, the user reference module is further configured to incorporate a plurality of pre-defined industry standards relevant for the equipment category in the normalized information to enhance the generated uniform equipment characteristics with respect to the pre-defined industry standards.

In another embodiment of the invention, the system also comprises a relationship context module configured to leverage a predefined equipment relationship model to determine and incorporate the effect of representation of physical interactions of the equipment category with other equipment categories and of external conditions on each of the plurality of equipment in the generated uniform equipment characteristics.

In yet another embodiment of the invention, the relationship context module further comprises a hierarchical characterization module configured to determine impact of change in behavior of each of the plurality of equipment belonging to an ecosystem on an equipment belonging to a different equipment category in the ecosystem based on transitive or intransitive relationship between each of the plurality of equipment and the equipment belonging to the different equipment category. Also, the characteristics of the plurality of equipment in transitive relationship are mutually dependent and the characteristics of the plurality of equipment in intransitive relationship are mutually independent.

In another embodiment of the invention, the hierarchical characterization module is configured to determine mutually independent characteristics for the plurality of equipment which have impact on the equipment category. The hierarchical characterization module is further configured to convert the transitive characteristics across multiple steps in the hierarchy of the plurality of equipment into an equipment transitive characteristics representing the impact.

In yet another embodiment of the invention, the hierarchical characterization module is further configured to determine the intransitive and transitive characteristics for each of the plurality of equipment in the equipment category recursively till all the characteristics are determined.

In still another embodiment of the invention, the variance handling module is further configured to manipulate the variances from the translated uniform data stream. The translated uniform data stream comprises measurements available for the equipment category or its components. The translated uniform data stream is made independent of the variances by assigning priority to one or more variables representing one or more measurement methods for the characteristics received as part of the translated uniform data stream for each of the plurality of equipment and generate a hierarchy of the variables based on assigned priority information.

In a different embodiment of the invention, the variance handling module is further configured to manipulate the variances from the translated uniform data stream comprising different representation of one or more parameters used for operation of the plurality of equipment and interactions independent of control systems for the plurality of equipment by assigning priority to one or more variables representing control methods for the characteristics received as part of the translated uniform data stream for each of the plurality of equipment and generate a hierarchy of the variables based on assigned priority information.

In an embodiment of the invention, the variance handling module is further configured to represent one or more component processes in each of the plurality of equipment and for manipulating the variances from the translated uniform data stream comprising different representations by equipment manufacturers of similar physical interactions between physical components. The translated uniform data stream is made independent of the variances by assigning priority to one or more variables representing the component processes for the characteristics received as part of the translated uniform data stream for each of the plurality of equipment and generate a hierarchy of the variables based on assigned priority information.

In another embodiment of the invention, the variance handling module is further configured to enhance the generated uniform equipment characteristics corresponding to the equipment category based on the normalized information and generated hierarchy of variables. The variance handling module is further configured to automatically select a next variable or combination of variables in defined hierarchy in absence of higher order variable data in received data stream to enhance the uniform equipment characteristics.

In yet another embodiment of the invention, the system is further configured to enable a user to add one or more new variables to a hierarchy of variables generated by the variance handling module on identification of new variables owing to variations in the incoming data stream.

Various embodiments of the invention describe a method for uniformly characterizing equipment category. The method comprises steps of extracting a plurality of data points from data stream received from a plurality of equipment within an equipment category. The data stream received from each of the plurality of equipment is uniformly translated before providing as input to an information extraction module. The method also comprises steps of normalizing, by a frequency decoupling module, the varying frequency of the extracted data points to generate time normalized information corresponding to each of the plurality of equipment in the equipment category. The method further comprises steps of manipulating, by a variance handling module, a plurality of variances in the translated uniform data stream received from each of the plurality of equipment within the equipment category. The method comprises steps of generically mapping, by a generalized mapping module, the normalized information to one or more aggregation methods and for mapping the output of aggregation methods to one or more reusable data processing algorithms to generate a plurality of uniform equipment characteristics corresponding to the equipment category.

In an embodiment of the invention, the frequency decoupling module is further configured to generate the normalized information at one or more pre-defined frequencies.

In another embodiment of the invention, the plurality of variances in the translated uniform data stream are by virtue of technology, vendor, make, model and version of the plurality of equipment.

In yet another embodiment of the invention, the generated uniform equipment characteristics represent different synchronous frames of received data stream in time domain for determining and benchmarking equipment behavior, equipment usage pattern and interaction simulations.

In an embodiment of the invention, the generated uniform equipment characteristics is enhanced by a user reference module by comparing the normalized information corresponding to each of the plurality of equipment with a reference input configured by a user. Also, the reference input comprises a plurality of policies and references that define objective of the user to isolate the impact of user preferences from a plurality of base characteristics of each of the plurality of equipment. The base characteristics are common characteristics of the equipment category for which it is designed by one or more manufacturers of the same equipment category.

In a different embodiment of the invention, the user reference module incorporates a plurality of pre-defined industry standards relevant for the equipment category in the normalized information to enhance the generated uniform equipment characteristics with respect to the pre-defined industry standards.

In another embodiment of the invention, a user defined equipment relationship model is leveraged by a relationship context module to determine and incorporate the effect of representation of physical interactions of the equipment category with other equipment categories and of external conditions on each of the plurality of equipment in the generated uniform equipment characteristics.

In yet another embodiment of the invention, the relationship context module further comprises a hierarchical characterization module configured to determine impact of change in behavior of each of the plurality of equipment belonging to an ecosystem on an equipment belonging to a different equipment category in the ecosystem based on transitive or intransitive relationship between each of the plurality of equipment and the equipment belonging to the different equipment category. Also, the characteristics of the plurality of equipment in transitive relationship are mutually dependent and the characteristics of the plurality of equipment in intransitive relationship are mutually independent.

In another embodiment of the invention, the hierarchical characterization module determines mutually independent characteristics for the plurality of equipment which have impact on the equipment category and converts the transitive characteristics across multiple steps in the hierarchy of each of the plurality of equipment into an equipment transitive characteristics representing the impact.

In yet another embodiment of the invention, the hierarchical characterization module determines the intransitive and transitive characteristics for the plurality of equipment in the equipment category recursively till all the characteristics are determined.

In still another embodiment of the invention, the variance handling module manipulates the variances from the translated uniform data stream. The translated uniform data stream comprises measurements available for the equipment category or its components. The translated uniform data stream it is made independent of the variances by assigning priority to one or more variables representing one or more measurement methods for the characteristics received as part of the translated uniform data stream for each of the plurality of equipment and generate a hierarchy of the variables based on assigned priority information.

In a different embodiment of the invention, the variance handling module manipulates the variances from the translated uniform data stream comprising different representation of one or more parameters used for operation of the plurality of equipment and interactions independent of control systems for the plurality of equipment by assigning priority to one or more variables representing control methods for the characteristics received as part of the translated uniform data stream for each of the plurality of equipment and generate a hierarchy of the variables based on assigned priority information.

In an embodiment of the invention, the variance handling module represents one or more component processes in each of the plurality of equipment and for manipulating the variances from the translated uniform data stream comprising different representations by equipment manufacturers of similar physical interactions between physical components. The translated uniform data stream is made independent of the variances by assigning priority to one or more variables representing the component processes for the characteristics received as part of the translated uniform data stream for each of the plurality of equipment and generate a hierarchy of the variables based on assigned priority information.

In another embodiment of the invention, the variance handling module enhances the generated uniform equipment characteristics corresponding to the equipment category based on the normalized information and generated hierarchy of variables. Also, the variance handling module automatically selects a next variable or combination of variables in defined hierarchy in absence of higher order variable data in received data stream to enhance the uniform equipment characteristics.

In yet another embodiment of the invention, a user is enabled to add one or more new variables to a hierarchy of variables generated by the variance handling module on identification of new variables owing to variations in the incoming data stream.

In another different embodiment of the invention, a computer readable medium is disclosed for uniformly characterizing equipment category. The computer readable medium comprises one or more processors and a memory is coupled to the one or more processors, the memory stores instructions executed by the one or more processors. The one or more processors are configured to extract a plurality of data points from data stream received from a plurality of equipment within an equipment category. Also, the data stream received from each of the plurality of equipment is uniformly translated before providing as input to an information extraction module. The one or more processors are further configured to normalize, by a frequency decoupling module, the varying frequency of the extracted data points to generate time normalized information corresponding to each of the plurality of equipment in the equipment category. The one or more processors are also configured to manipulate, by a variance handling module, a plurality of variances in the translated uniform data stream received from each of the plurality of equipment within the equipment category. The one or more processors are configured to generically map, by a generalized mapping module, the normalized information to one or more aggregation methods and for mapping the output of aggregation methods to one or more reusable data processing algorithms to generate a plurality of uniform equipment characteristics corresponding to the equipment category.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Corresponding reference numerals indicate corresponding parts throughout the drawings.

DETAILED DESCRIPTION

Figure 1:
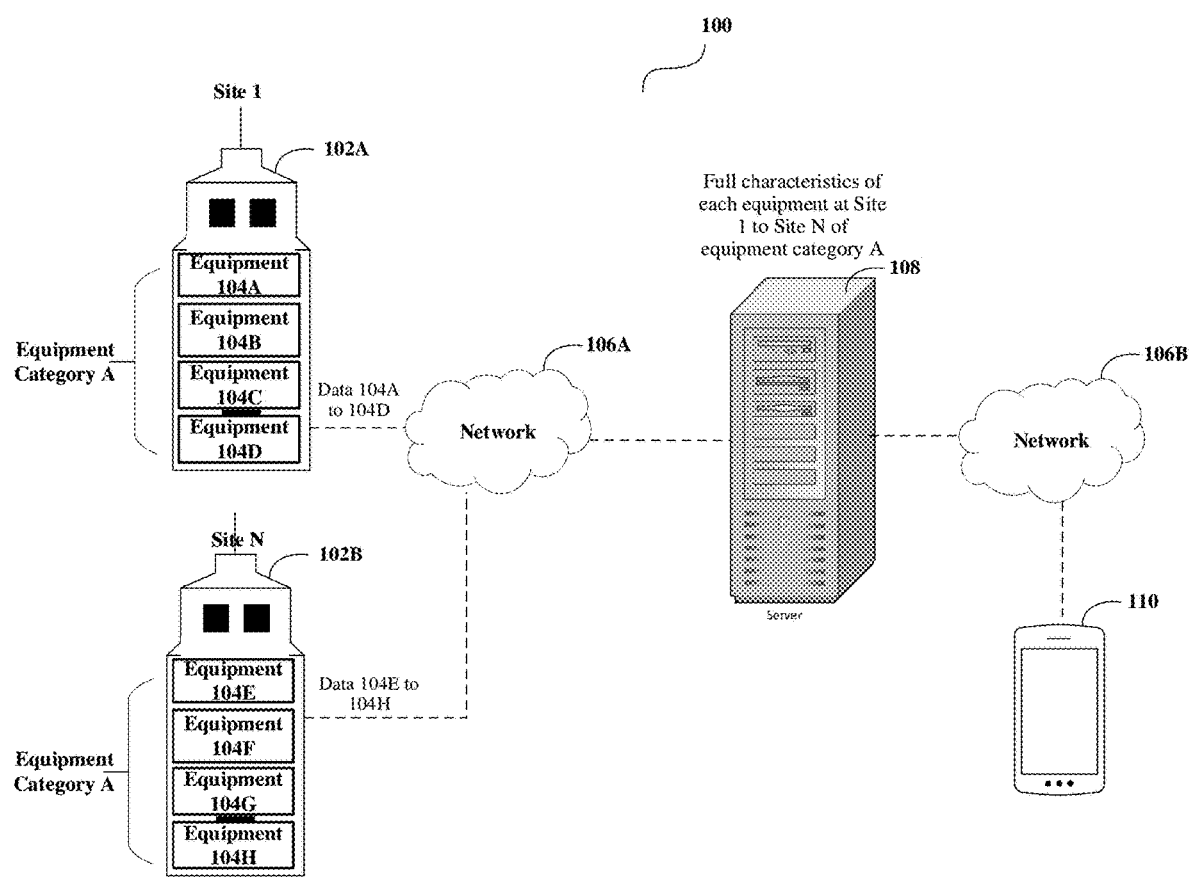
FIG. 1 depicts an exemplary system architecture according to an exemplary embodiment of the invention.

Described herein is the technology with a system and a method for uniformly characterizing equipment category. One or more sites may have a plurality of equipment present inside or outside the site. Each of these plurality of equipment within an equipment category may also have the capability to determine and transmit data stream to a server through a network. When the server receives the data stream from each of the plurality of equipment, the data stream may be uniformly translated by the server. In an exemplary embodiment, the data stream may be uniformly translated by the server. In another exemplary embodiment, the data stream may be uniformly translated by each of the plurality of equipment. Also, the server may either transmit the uniformly translated data stream to a device for further processing or may itself process the uniformly translated data stream. In addition, the translated data stream may be processed to manipulate a plurality of variances in the translated data stream.

The uniformly translated data stream may be processed to extract a plurality of data points for each of the plurality of equipment. And, the extracted plurality of data points may also be processed to normalize the varying frequency of the extracted data points for generating time normalized information corresponding to each of the plurality of equipment in the equipment category. Then, a plurality of uniform equipment characteristics corresponding to the equipment category may be generated by mapping the normalized information to one or more aggregation methods and for mapping the output of aggregation methods to one or more reusable data processing algorithms which have been described in details below.

As used herein, the plurality of equipment may have capability to determine and generate data stream as described below. Each of the plurality of equipment may be connected with the server through the network and transmit the data stream to the server. Such plurality of equipment may be refrigerators, air conditioners, heating, ventilation, and air conditioning (HVAC) systems, chillers, televisions, geysers, lights, laptops, computers, mobile devices, wearable devices, fans, cameras or any such equipment that is well known in the art.

As used herein, the server has processing capabilities as disclosed further in the specification. The server may be a cloud storage, a remote database, or any such storage known in the art.

As used herein, the network may refer to a wired network, a mesh network, a cellular network such as Global System for Mobile (GSM) network, a Long-Term Evolution (LTE) network, a code-division multiple access (CDMA) network, a narrow-band internet of thing (NB-IoT) technique or category M1 technique or any such network/technique that is known in the art.

Throughout the specification, reference numeral 102 depicts all sites. Each of the reference numerals 102A-102B may be considered as a separate site. Also, throughout the specification, reference numeral 104 depicts all equipment. Each of the reference numerals 104A-104H may be considered as a separate equipment.

FIG. 1 depicts an exemplary system architecture 100 according to an exemplary embodiment of the invention. As can be seen in FIG. 1, a building/site 102A (i.e. Site 1) may have a plurality of equipment (i.e. four equipment), namely 104A, 104B, 104C and 104D. Similarly, another site 102B (i.e. Site N) may also have four equipment, namely 104E, 104F, 104G and 104H. These equipment 104 may be located inside or outside the site 102. Further, each of these plurality of equipment 104 may determine data stream. For an example, the data stream generated by each of the plurality of equipment 104 may comprise of an equipment identifier, equipment connectivity identifiers, equipment end usage identifier, streaming data etc. To determine the data stream, each of the plurality of equipment 104 in each site 102 may determine functioning, operation, performance, utilization, location, end usage, and/or conditions of each equipment 104 and of one or more components of each equipment 104. Each of the plurality of equipment 104 may also determine a model type/version, size, a manufacturer and/or any such data. For determining the data stream, each of these plurality of equipment 104 may employ detector/s, sensor/s, controller/s, monitor/s or any such device. Each of the equipment 104 may generate and collate such data stream and may transmit the data stream to a server 108 through a network 106A. In an exemplary embodiment, before transmitting the data stream to the server 108, the data stream may be uniformly transformed/translated by a data management layer at the equipment 104 or at the cloud. The data stream may be uniformly transformed/translated using the methodology as described in U.S. patent Ser. No. 10/013,725 B2 (Titled "Architecture for energy management of multi customer multi time zone distributed facilities") which is incorporated herein by reference.

When the server 108 receives the data stream from each of the plurality of equipment 104 within an equipment category, the server 108 may uniformly translate the data stream of each of the plurality of equipment 104. Moreover, the server 108 may also identify a category to which each of the plurality of equipment 104 belong based on the received data stream. For an instance, an equipment may belong to a refrigerator category, an air conditioner category, a heating, ventilation, and air conditioning (HVAC) systems category, a chiller category, a television category, a geyser category, a light category, a laptop category, a computer category, a mobile device category, a wearable device category, a fan category, a camera category or any such equipment category that is well known in the art. The translated data stream (i.e. Data 104A—Data 104D at Site 1 and Data 104E-Data 104H at Site 2) may be used by the server 108 to generate a plurality of uniform equipment characteristics corresponding to each of the equipment category using a system 200 which is explained below. In particular, the translated data stream may be used to extract a plurality of data points and then the plurality of data points may be normalized for the varying frequency to generate time normalized information. The generated time normalized information may then be mapped to generate a plurality of uniform equipment characteristics corresponding to the equipment category.

Moreover, the server 108 may transmit output/s (i.e. the uniform equipment characteristics corresponding to the equipment category) of the system 200 to a device 110 through a network 106B, wherein the device 110 may exhibit such output/s. Further, a user may access the system 200 using the device 110. For an instance, characteristics for the equipment category A for equipment 104A to 104D in Site 102A may comprise uniform equipment characteristics relevant to data 104A to 104D and enhanced characteristics in absence of higher order variables data. Similarly, characteristics for equipment category A for equipment 104E to 104H in Site 102B may comprise uniform equipment characteristics relevant to data 104E to 104H and enhanced characteristics in absence of higher order variables data.

Figure 2:
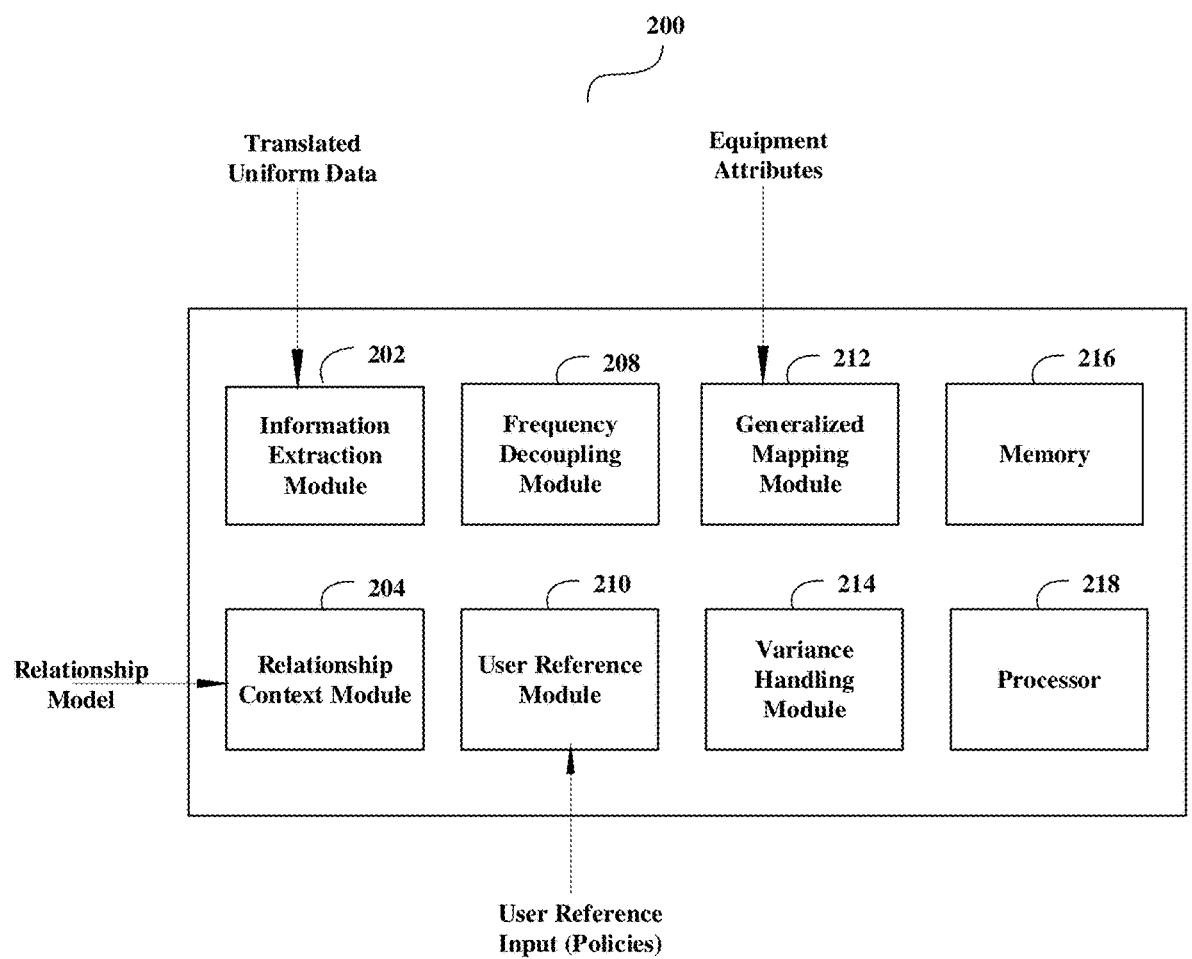
FIG. 2 depicts a block diagram of different components of an exemplary system or device according to an exemplary embodiment of the invention.

FIG. 2 depicts a block diagram of different components of an exemplary system 200 of the server 108 according to an exemplary embodiment of the invention. The system 200 may comprise, but is not limited to, an information extraction module 202, a relationship context module 204, a frequency decoupling module 208, a user reference module 210, a generalized mapping module 212, a variance handling module 214, a memory 216 and/or a processor 218.

The information extraction module 202 may be configured to extract a plurality of data points from data stream received from a plurality of equipment 104 within an equipment category for each of the plurality of equipment 104. As explained above in FIG. 1, the data stream received from each of the plurality of equipment 104 may be uniformly translated before providing as an input to the information extraction module 202. For an instance, a plurality of data points may be extracted for an equipment 104A located at the site 102A. Similarly, the plurality of data points may be separately extracted for each individual equipment 104 located at each site 102. The extraction of the plurality of data points from the translated data stream may be done using various aggregation methods. Also, the plurality of data points may comprise maximum values, minimum values, average values, increasing number of changes, decreasing number of changes etc. The information extraction module 202 may be configured to communicate the extracted plurality of data points as an input to the frequency decoupling module 208.

The frequency decoupling module 208 may be configured to normalize the varying frequency of the extracted data points to generate time normalized information for each of the plurality of equipment 104 in the equipment category. Particularly, the time normalized information may be generated by decoupling the extracted data points from varying frequencies of received extracted data points. In other words, the extracted plurality of data points for each of the plurality of equipment 104 may vary in frequency. That is, each of the plurality of equipment 104 may transmit the data stream to the server 108 in near real time, in minutes, hourly, daily, weekly, monthly, quarterly and the like. In an exemplary embodiment, the data stream may be received asynchronously based on an occurrence of an event. In another exemplary embodiment, the data stream may be updated very frequently (or in high frequency) in near real time whereas the impact of work done on each of the plurality of equipment 104 is updated at different time intervals. The asynchronous data and its frequency determines the volume of data. Such volume of data and the frequency may be decoupled (or removed) from the extracted plurality of data points by the frequency decoupling module 208 to generate the time normalized information for each of the plurality of equipment 104. In addition, the frequency decoupling module 208 may generate the time normalized information at one or more pre-defined frequencies. Also, the frequency decoupling module 208 may use aggregation technique/s to perform decoupling. Further, the extracted plurality of data points of the equipment 104 may be normalized for a specific time interval by configuring the normalization frequency to any desired value such as hourly, daily, monthly etc.

The frequency decoupling module 208 may further be configured to decouple cost incurred due to processing volume of the extracted plurality of data points based on frequency of receiving the extracted plurality of data points and the processing cost of generating uniform equipment characteristics for each of the plurality of equipment 104. The information extraction module 202 extracts the plurality of data points and the frequency decoupling module 208 generates the time normalized information without losing any information. Moreover, the received data stream may be discarded once the time normalized information is generated and used for generating the uniform equipment characteristics.

The frequency decoupling module 208 may communicate the time normalized information to the generalized mapping module 212. The generalized mapping module 212 may be configured to generate a plurality of uniform equipment characteristics corresponding to the equipment category. To generate the plurality of uniform equipment characteristics, the generalized mapping module 212 may generically map the normalized information to aggregation techniques/methods and then may further map the output of aggregation methods to one or more reusable data processing algorithms to generate the uniform equipment characteristics. In particular, the generalized mapping module 212 may map the normalized information of an equipment category to a right set of data processing algorithms to generate characteristics of the equipment 104. The set of data processing algorithms for characteristics are different for a different equipment category. Further, the generalized mapping module 212 may map the normalized information of each of the plurality of equipment 104 (characteristics are generic across equipment category) to data processing algorithms for characteristics. The data processing algorithms may be available as part of a library. Further, the generalized mapping module 212 may be configured for characterization of data for the plurality of equipment 104 under the same category. Referring to FIG. 1, characteristics for equipment category A for equipment 104A to 104D at Site 1 and characteristics for equipment category A for equipment 104E to 104H at Site N may be generated. Also, the generalized mapping module 212 enables an easy extensibility to define new conventions and mapping logic by adapting its behavior via configuration information. The configuration information may be supplied to the system 200 by a domain expert to alter the behavior of the system 200 to make the system 200 generically configurable and extensible for variances in the extracted data points and thereby providing the capability to handle any new equipment, version, vendor, make, facilities etc.

As used herein, the generated uniform equipment characteristics for the plurality of equipment comprises feature sets of each of the plurality of equipment. Also, the uniform equipment characteristics may represent different synchronous frames of received data stream in time domain for determining and benchmarking equipment behavior, equipment usage pattern and interaction simulations. Further, analytics data is derived from the characterized data for deriving insights and behavior of each of the plurality of equipment 104.

To generate the uniform equipment characteristics for each of the plurality of equipment 104, the system 200 may further use the variance handling module 214. The variance handling module 214 may be configured to manipulate a plurality of variances in the translated uniform data stream within the equipment category. The plurality of variances in the translated uniform data stream are by virtue of technology, vendor, make, model and version of the plurality of equipment 104 at different sites 102. The variations in the data points are due to plurality of make and models of the plurality of equipment 104 available in the site 102. In an exemplary embodiment, zone temperature characteristic of an equipment (i.e. roof top unit (RTU)) may be determined by taking average of the temperature data points recorded by a plurality of sensors in the site 102. In another exemplary embodiment, the zone temperature characteristics of the equipment may be determined by taking an absolute value provided by the temperature sensor available at the site 102. In addition, the basic characteristics for an equipment 104 within the equipment category do not change and remain fixed/constant irrespective of any make/model of the equipment 104 at the site 102. For example, characteristic "zone temperature" of an equipment (RTU) within the category of air-conditioners is calculated for all the equipment irrespective of its make and model.

Further, the manipulation of the variances from the translated uniform data stream may comprise measurements available for the equipment category or one or more components of the equipment 104. Also, the translated data stream is made independent of the variances by assigning priority to one or more variables representing one or more measurement methods for the characteristics received as part of the translated uniform data stream for each of the plurality of equipment 104 and generate a hierarchy of the variables based on assigned priority information.

Further, the manipulation of the variances from the translated uniform data stream by the variance handling module 214 may comprise different representation of one or more parameters used for operation of the plurality of equipment 104 and the interactions independent of control systems for the equipment 104 to make it independent of the resulting variances. This is done by assigning priority to one or more variables representing control methods for the characteristics received as part of the translated uniform data stream for each of the plurality of equipment 104 and generate the hierarchy of the variables based on assigned priority information.

Also, the variance handling module 214 may further be configured to represent one or more component processes in the plurality of equipment 104. The manipulation of the variances from the translated uniform data stream may comprise different representations by manufacturers of the plurality of equipment 104 of similar physical interactions between physical components in the equipment 104 generalized by the technology used to make it independent of the resulting variances. This is done assigning priority to one or more variables representing the component processes for the characteristics received as part of the translated uniform data stream for each of the plurality of equipment 104 and generate a hierarchy of the variables based on assigned priority information. The system 200 may further be configured to enable a user to add one or more new variables to the hierarchy of variables generated by the variance handling module 214 on identification of new variables owing to variations in the incoming data stream.

Moreover, the variance handling module 214 may further be configured to enhance the generated uniform equipment characteristics corresponding to the equipment category based on the normalized information and generated hierarchy of variables. Also, the variance handling module 214 may still further be configured to automatically select a next variable or combination of variables in defined hierarchy in absence of higher order variable data in received data stream to enhance the uniform equipment characteristics. The absence of higher order variable data is because of absence of specific variables from manufacturers of the plurality of equipment 104, make and model or data collection failures in the plurality of equipment 104. The variance handling module 214 may manipulate variances by most common characteristic/s or most common way of defining the characteristic/s and then looking for incremental changes based on make/configuration or model of the plurality of equipment 104. Also, the variance handling module 214 may check if the data stream is not available then looking for second most common characteristic/s. And if the second most common characteristic/s is not available in the data stream then looking for third one and so on. Thus, the variance handling module 214 makes sure of generating the uniform equipment characteristics even if the data stream is absent or faulty. Thereby, the process of generating the uniform equipment characteristics is made much more redundant and independent from any particular data loss.

In an exemplary embodiment, the variables of the plurality of equipment may comprise load information variable(s), performance information variable(s), and/or power consumption information variable(s). For an example, the priority may be given to the load information variable(s) to determine load characterization for the equipment 104. In case, if the load information variable is not present in the data stream or the extracted data points, then information variable(s) may be provided as the next priority (e.g. number of stages of equipment running). Similarly, other variables are given priority in a hierarchical order defined by the variance handling module 214. The system 200 enables easy addition of new variables (when identified) in the hierarchical order by the domain expert due to any variation in the equipment data.

To generate the uniform equipment characteristics for each of the plurality of equipment 104, the system 200 may further use the relationship context module 204. The relationship context module 204 may be configured to leverage a predefined equipment relationship model to determine and incorporate the effect of representation of physical interactions of the equipment category with other equipment categories and of external conditions on the individual equipment 104 in the generated uniform equipment characteristics. The equipment relationship model is explained in U.S. patent Ser. No. 10/380,705B2 (Titled "System and method for modeling of target infrastructure for energy management in distributed-facilities") which is incorporated herein by reference. The equipment 104 in the site 102A or in the site 102B may be related to each other as part of an ecosystem. Thus, change in behavior of any equipment belonging to the ecosystem has an impact on other equipment within the site 102. The relation between the plurality of equipment 104 regarding change in behavior of one equipment with respect to another equipment may be captured using the relationship model which exists for each of the plurality of equipment 104.

The relationship context module 204 may maintain a relation of a first equipment with a second equipment and establishes relation between these equipment to generate the characteristics of the first equipment in context of relation with the second equipment in the ecosystem. Such relationship between the two equipment may be known to domain users and/or to the system 200 via equipment relationship model/s. The relationship context module 204 may use the relationship model of equipment 104 as an input to establish context for normalized information of the related equipment. The relationship context module 204 establishes the notion of causality and time relationship between the normalized information of equipment 104 that is received in time spaced manner. In an exemplary embodiment, based on the relationship model and the normalized information, the relationship context module 204 may determine that the performance output of an equipment may change due to change in performance output of a related equipment. The relationship context module 204 thus converts the normalized information into aggregated processed parameters at different predefined time intervals.

Moreover, the relationship between the equipment 104 may be classified as transitive (i.e. mutually depending) relation or intransitive relation (i.e. independent). Also, the relationship between grouped equipment such as roof top units (i.e. RTUs) serving to a common space has a transitive relation with an overall HVAC/RTU system for the common space. On the other hand, conditions to HVAC systems in the site is an intransitive relationship.

In addition, the relationship context module 204 may further comprise a hierarchical characterization module which may be configured to determine impact of change in behavior of the plurality of equipment 104 belonging to an ecosystem on an equipment belonging to a different equipment category in the ecosystem based on transitive or intransitive relationship between the plurality of equipment 104 and the equipment belonging to the different equipment category. Further, the characteristics of the plurality of equipment in transitive relationship are mutually dependent and the characteristics of the plurality of equipment in intransitive relationship are mutually independent. Also, the hierarchical characterization module may be configured to first determine mutually independent characteristics for the equipment 104 which have impact on the relevant equipment category. The hierarchical characterization module may further be configured to convert the transitive characteristics across multiple steps in the hierarchy of the equipment into an equipment transitive characteristics representing the impact. Furthermore, the hierarchical characterization module may further be configured to determine the intransitive and transitive characteristics for the plurality of equipment 104 in the equipment category recursively till all the characteristics of the plurality of equipment 104 are determined.

In an exemplary embodiment, the relationship between the plurality of equipment may be represented as follows:
Single Equipment☐Belonging To☐Area of Site☐Relates To☐Grouped Equipment of the Area☐Relates To☐System In other words, a single equipment identified in data stream of multiple equipment belonging to multiple sites need to be identified as belonging to a particular site. The equipment also needs to be identified as belonging to a group serving a particular function in the site. Also, finding characteristic of the first equipment is dependent on characteristic of the second equipment and finding characteristics of the second equipment further requires characteristic from the first equipment. In order to determine characteristic, identification of the group characteristics and the role of the individual characteristic in the group is required. For this, separate computational area called as "Namespace" is used as per equipment type/category as depicted below:

which may be determined at RTU level and transitive characteristics which may be computed based on the characteristics dependent on the site 102.

Moreover, the Namespace A may be assigned to determine the characteristics of the site 102. In this namespace, the characteristics of the site 102 that requires input from the RTU are ignored in the first calculation. The site characteristics may be provided as input to calculate the characteristics for RTU in Namespace B. Similarly, the characteristics of RTU system may be calculated in Namespace C based on the characteristics of RTU (calculated in Namespace B). Subsequently, the site characteristics that were ignored during determination of Namespace A may be further calculated in a new Namespace D based on the input from RTU System characteristics (calculated in Namespace C). Similarly, the RTU characteristics ignored during calculation of Namespace B may be calculated in a new Namespace E based on the input from site characteristics (calculated in Namespace D). The output of the system is characteristics of the equipment that are uniform across all the equipment 104 within the category.

To generate the uniform equipment characteristics for each of the plurality of equipment 104, the system 200 may further use the user reference module 210. The user reference module 210 may be configured to enhance the generated uniform equipment characteristics by comparing the normalized information corresponding to each equipment with a reference input configured by the user to isolate the impact of user preferences from a plurality of base characteristics of the equipment. Also, the reference input comprises a plurality of policies and references that define objective of the user. The base characteristics are common characteristics of the equipment category for which it is designed by one or more manufacturers of the same equipment category. Further, the user reference module 210 may further be configured to incorporate a plurality of predefined industry standards relevant for the equipment cat-

TABLE 1

| Namespace A | Namespace B | Namespace C | Namespace D | Namespace E |
|---|---|---|---|---|
| Site Characteristics independent at site (e.g. Outside air temperature i.e. OAT) | RTU Characteristics which depend on independent characteristics of site (e.g. OAT dependent Characteristics of RTU) | RTU System Grouped characteristic of RTUs (e.g. group response characteristics based on OAT) | Site Grouped Characteristics of multiple groups of RTUs (e.g. HVAC consumption with OAT response characteristics of RTUs) | RTU Individual RTU characteristics difference with respect to the group response |

As shown in Table 1 above, a unique namespace may be assigned to determine characteristics of an equipment in a category with respect to the hierarchy of characteristics determination. The calculations may then be passed onto another namespace for further determination of characteristics of second equipment in the category and so on. Usage of new namespace allows the freedom to determine the characteristic of an equipment based on characteristics of other equipment. The order of namespace determines the processing order for the characteristic determination. In above Table 1, Namespace B, C, D, E may be used to determine characteristics with transitive dependency based on intransitive characteristics determined at Namespace A (Site) and Namespace B (RTU operation characteristics). Namespace B may have both intransitive characteristics egory in the normalized information to enhance the generated uniform equipment characteristics with respect to the pre-defined industry standards. In an exemplary embodiment, the variation of zone temperature from pre-defined value of user reference is identified as one of the equipment characteristics. In another exemplary embodiment, increase in temperature, decrease in temperature, difference between first and last recorded temperature in a given time duration are treated as pre-defined equipment characteristics.

The functioning of various modules described above can be understood in detail by considering following example of a Rooftop Air Conditioning Unit (RTU). Three example characteristics of the RTU may be taken into consideration in this case namely zone temperature, active setpoint and its outside temperature condition. Some of the zone temperature measurement variances are single temperature sensor at the zone conditioned by RTU, multiple temperature sensors at different locations of the zone. In case zone sensor is absent or faulty, a return sensor acts as a proxy for the zone sensor. Example characteristics for the RTU related to zone temperature sensing for a synchronous time frame may be zone temperature maintained (Average), maximum zone temperature reached, minimum zone temperature reached, change in zone temperature, variation in zone temperature with respect to the user policy, variation in zone temperature with respect to the active setpoint, variation of zone temperature maintained by RTU with respect to zone temperature maintained by the system of RTUs to which the RTU belongs, variation of zone temperature with respect to outside temperature. In one example embodiment, for RTU 1, zone temperature and active setpoint samples are collected at 12 samples/hour, for RTU 2, 3 zone temperature sensors provide zone data at 4 samples/hour along with active setpoint at same frequency, for RTU 3, Zone temperature sensor is defective, hence zone characteristics need to be filled using return sensor data coming at 4 samples/hour. For all these RTUs, outside air temperature is available from weather feed at 2 updates per hour. The data flow via various modules for this example is tabulated in Table 2 to Table 6 below. As explained in Table 2 to Table 6 below, the generalized mapping module 212 maintains relation between the location, RTU system and the RTU. Information extraction methods are applied for all data point types on available and valid data as explained in information extraction column. Applicable time frames are configured by equipment category. Variance handling hierarchy are applicable by equipment category for individual characteristics. The calculation method utilized for the identified time frame can vary based on availability of data for each equipment and is automatically determined and resolved for every time frame. Lastly, resolved characteristics are computed.

TABLE 2

| Translated Data Stream | Location | RTU System | RTU | Info extraction | Sample count | Frequency decoupling | Variance handling order | Calculation method utilized for the identified timeframe | Characteristics at identified timeframe |
|---|---|---|---|---|---|---|---|---|---|
| Multi zone sensor data | XYZ | #A | #1 | Is multi sensor available and valid?- No | None | | Multi Zone Sensor reading | | Zone Temp maintained (Average), Maximum Zone Temperature reached, Minimum Zone Temperature reached, Change in Zone temperature etc. |
| | ABC | #B | #2 | Is Multi Zone sensor data available and valid?- Yes, Apply list of info extraction methods on ordered samples | 4 samples * 3 sensors | Type: Hourly synchronization; multi zone sensor (average, max, min, change, increments, decrements etc.) of samples | | Multi Zone sensor info extractions from 12 samples(3 sensors, 4 samples per sensor) | |
| | EFG | #C | #3 | Is multi sensor available and valid?- No | None | | | | |

TABLE 3

| Translated Data Stream | Location | RTU System | RTU | Info extraction | Sample count | Frequency decoupling | Variance handling order | Calculation method utilized for the identified timeframe | Characteristics at identified timeframe |
|---|---|---|---|---|---|---|---|---|---|
| Single Zone Temperature | XYZ | #A | #1 | Is Single Zone sensor data available and valid?- Yes, Apply list of info extraction methods on ordered samples | 12 samples | Type: Hourly synchronization; single zone sensor (average, max, min, change, increments, decrements etc.) of samples | Zone Sensor reading | Zone sensor info extractions from 12 samples | Zone Temp maintained (Average), Maximum Zone Temperature reached, Minimum Zone Temperature reached, Change in Zone |
| | ABC | #B | #2 | Not Applicable | None | | | | |

TABLE 3-continued

| Translated Data Stream | Location | RTU System | RTU | Info extraction | Sample count | Frequency decoupling | Variance handling order | Calculation method utilized for the identified timeframe | Characteristics at identified timeframe |
|---|---|---|---|---|---|---|---|---|---|
| | EFG | #C | #3 | Is Single Zone sensor data available and valid?- No | None | | | | temperature etc. |

TABLE 4

| Translated Data Stream | Location | RTU System | RTU | Info extraction | Sample count | Frequency decoupling | Variance handling order | Calculation method utilized for the identified timeframe | Characteristics at identified timeframe |
|---|---|---|---|---|---|---|---|---|---|
| Return Temperature | XYZ | #A | #1 | Not Applicable | 4 samples | | Return Sensor | | Zone Temp maintained (Average), Maximum Zone Temperature reached, Minimum Zone Temperature reached, Change in Zone temperature etc. |
| | ABC | #B | #2 | Not Applicable | | Type: Hourly synchronization; Return sensor (average, max, min, change, increments, decrements etc.) of samples | | Return Temp. sensor info extractions from 12 samples | |
| | EFG | #C | #3 | Is Return Temperature sensor data available and valid?- Yes, Apply list of info extraction methods on ordered samples | | | | | |

TABLE 5

| Translated Data Stream | Location | RTU System | RTU | Info extraction | Sample count | Frequency decoupling | Variance handling order | Calculation method utilized for the identified timeframe | Characteristics at identified timeframe |
|---|---|---|---|---|---|---|---|---|---|
| Active Setpoint | For all 3 examples | | | Is Active Setpoint available and valid?- Yes, Apply list of info extraction methods on ordered samples | Sample count different | Type: Hourly synchronization; Active Setpoint (average) of samples | Active Setpoint | Active Setpoint info extractions from samples | Variation in Zone Temp with respect to active setpoint |

TABLE 6

| Other Characteristics | Location | RTU System | RTU | Relationship Context | User Ref | Variance handling order | Calculation method utilized for the identified timeframe | Characteristics at identified timeframe |
|---|---|---|---|---|---|---|---|---|
| System average | For all 3 examples | | | Average zone Temp for RTU System in which RTU belongs is available to | | | | Variation of zone temperature maintained by RTU with respect to zone temperature |

TABLE 6-continued

| Other Characteristics | Location | RTU System | RTU | Relationship Context | User Ref | Variance handling order | Calculation method utilized for the identified timeframe | Characteristics at identified timeframe |
|---|---|---|---|---|---|---|---|---|
| | | | | RTU through relationship of RTU to its system at identified timeframe | | | | maintained by the system of RTUs to which the RTU belongs |
| Weather data at XYZ Location | | For all 3 examples | | Outside air temperature weather feed for location available to RTU through RTU relationship to the Site it is located at identified timeframe | | | | Variation of Zone temperature with respect to weather feed outside temperature |
| | | For all 3 examples | | | User Policy for maintaining temperature of RTUs at identified timeframe | | | Variation in Zone temperature with respect to User Policy |

Moreover, the information extraction module 202, the relationship context module 204, the frequency decoupling module 208, the user reference module 210, the generalized mapping module 212, the variance handling module 214, and/or the memory 216 may be communicably coupled with the processor 218. The different units described herein are exemplary. The invention may be performed using one or more units. For example, the tasks executed by the information extraction module 202, the relationship context module 204, the frequency decoupling module 208, the user reference module 210, the mapping module 212, the variance handling module 214, the memory 216 and/or the processor 218 may be performed by a single unit. Alternatively, a greater number of units as described herein may be used to perform the present invention.

The present invention encompasses the system 200 to learn and improve the characteristics of the equipment 104 based on the end use of the characteristics. The system 200 may learn and fill the gaps in the characteristics due to absence of specific data either at an individual equipment connected to the system 200 or for a group of equipment of a particular make and model from an equipment manufacturer. Furthermore, the characteristics may be further improved with availability of additional metadata such as user references (end usage policies) and the attributes of the equipment 104. In addition, the characteristics from other equipment in the ecosystem may also improve the characteristics by decoupling the impact of the ecosystem on the equipment 104.

The present invention further encompasses onboarding of a new equipment category into the system 200. The prerequisite for the onboarding the new equipment category is for an engineering user to have a general understanding of the equipment category through publicly available best practices documents and/or material. The system 200 may also provide the facility for the manufacturer of the equipment 104 to differentiate their equipment in terms of functionality of unique elements where the characterization for the equipment category can be enhanced with characterization unique to a particular make or model. Also, the gap identification functionality may also be used by the manufacturer to enhance the digital characteristics of the equipment.

Various embodiments of the present invention provide the advantage of uniform equipment characteristics of equipment type is achieved independent of variances of underlining data, make, model, technology of data collection and dependency of other equipment in the system. Another advantage is the generation of the characteristics of equipment without any loss of information even though the data streams have differences in granularity and frequency or completely asynchronous. The present invention offers advantage of calculation of characteristics per equipment category in a complex interdependent equipment ecosystem.

Figure 3:
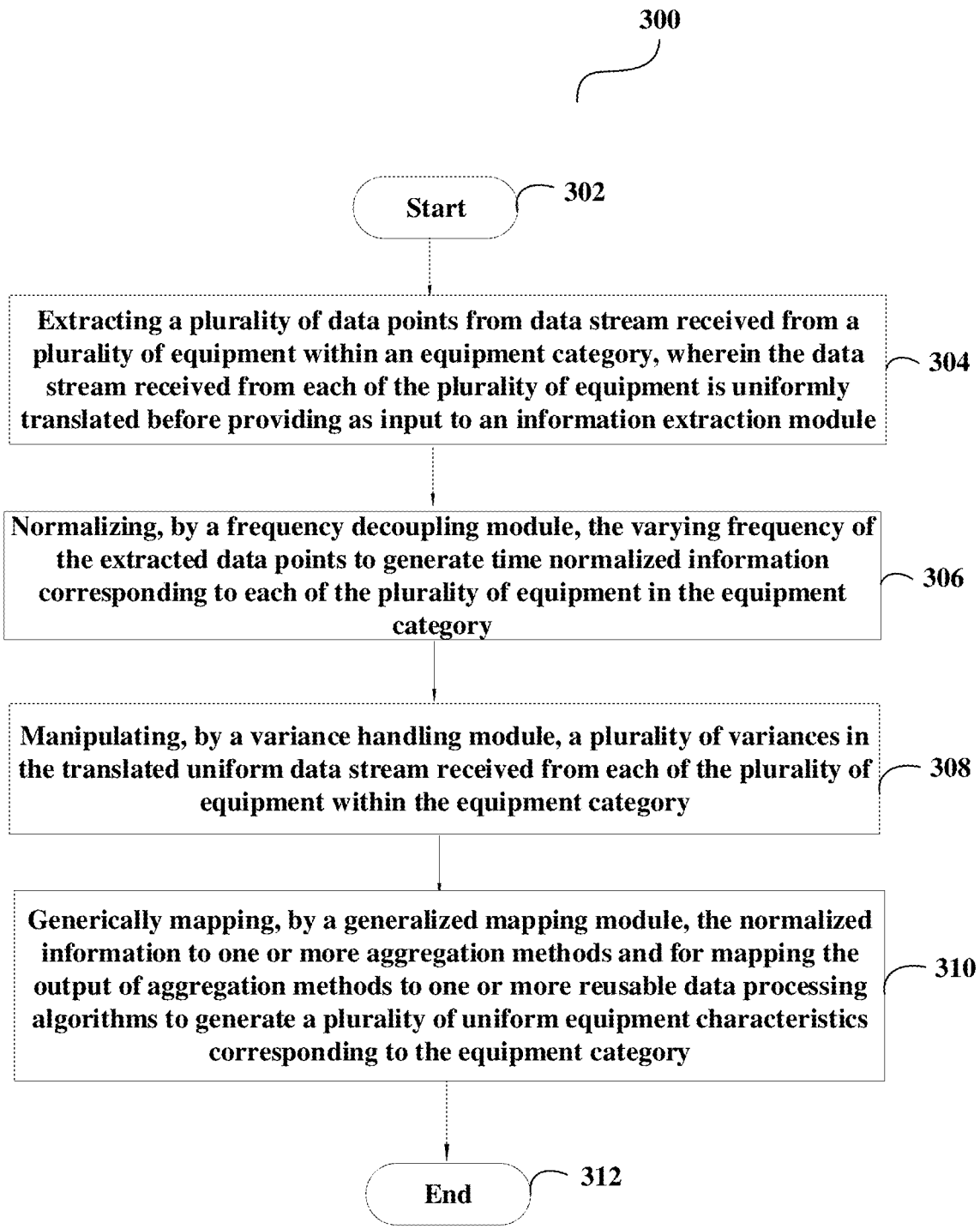
FIG. 3 depicts an exemplary flowchart illustrating a method to perform the invention according to an exemplary embodiment of the invention.

FIG. 3 depicts a flowchart outlining the features of the invention in an exemplary embodiment of the invention. The method flowchart 300 describes a method being for uniformly characterizing equipment category for a plurality of equipment 104 located at a site 102. The method flowchart 300 starts at step 302.

At step 304, a system 200 may extract a plurality of data points from data stream received from a plurality of equipment 104 within an equipment category. The data stream received from each of the plurality of equipment 104 may be uniformly translated before providing as input to an information extraction module 202. This has been explained in detail in FIG. 2 above.

At step 306, the system 200 may normalize, by a frequency decoupling module 208, the varying frequency of the extracted data points to generate time normalized information corresponding to each of the plurality of equipment 104 in the equipment category. This has been explained in detail in FIG. 2 above.

At step 308, the system 200 may manipulate, by a variance handling module 214, a plurality of variances in the translated uniform data stream received from each of the plurality of equipment 104 within the equipment category. This has been explained in detail in FIG. 2 above.

At step 310, the system 200 may generically map, by a generalized mapping module 212, the normalized information to one or more aggregation methods for mapping the output of aggregation methods to one or more reusable data processing algorithms to generate a plurality of uniform equipment characteristics corresponding to the equipment category. This has been explained in detail in FIG. 2 above. Then, the method flowchart 300 may end at 312.

The present invention is applicable in any industry/field that is well known in the art and where an equipment is utilized. The embodiments of the invention discussed herein are exemplary and various modification and alterations to a person skilled in the art are within the scope of the invention.

In one embodiment of the invention, the invention can be operated using the one or more computer readable devices. The one or more computer readable devices can be associated with a system 200. A computer readable medium comprises one or more processors and a memory coupled to the one or more processors, the memory stores instructions executed by the one or more processors. The one or more processors are configured to extract a plurality of data points from data stream received from a plurality of equipment 104 within an equipment category. Also, the data stream received from each of the plurality of equipment 104 is uniformly translated before providing as input to an information extraction module 202. The one or more processors are further configured to normalize, by a frequency decoupling module 208, the varying frequency of the extracted data points to generate time normalized information corresponding to each of the plurality of equipment 104 in the equipment category. The one or more processors are also configured to manipulate, by a variance handling module 214, a plurality of variances in the translated uniform data stream received from each of the plurality of equipment 104 within the equipment category. The one or more processors are configured to generically map, by a generalized mapping module 212, the normalized information to one or more aggregation methods and for mapping the output of aggregation methods to one or more reusable data processing algorithms to generate a plurality of uniform equipment characteristics corresponding to the equipment category.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for uniformly characterizing equipment category, the method comprising:
   extracting a plurality of data points from a data stream received from a plurality of equipment within an equipment category, wherein the data stream received from each of the plurality of equipment is uniformly translated before providing as input to an information extraction module;
   normalizing, by a frequency decoupling module, a varying frequency of the plurality of extracted data points to generate time normalized information corresponding to each of the plurality of equipment in the equipment category;
   manipulating, by a variance handling module, a plurality of variances in the translated uniform data stream received from each of the plurality of equipment within the equipment category; and
   generically mapping, by a generalized mapping module, the time normalized information to one or more aggregation methods and for mapping an output of the one or more aggregation methods to one or more reusable data processing algorithms to generate a plurality of uniform equipment characteristics corresponding to the equipment category.

2. The method of claim 1, further comprising, enhancing, by a user reference module, the generated plurality of uniform equipment characteristics by comparing the time normalized information corresponding to each of the plurality of equipment with a reference input configured by a user, wherein the reference input comprises a plurality of policies and references that define objective of the user to isolate an impact of user preferences from a plurality of base characteristics of each of the plurality of equipment, and wherein the plurality of base characteristics are common characteristics of the equipment category.

3. The method of claim 1, further comprising, leveraging, by a relationship context module, a predefined equipment relationship model to determine and incorporate an effect of representation of physical interactions of the equipment category with other equipment categories and of external conditions on each of the plurality of equipment in the generated plurality of uniform equipment characteristics.

4. The method of claim 1, further comprising adding one or more new variables to a hierarchy of variables generated by the variance handling module on identification of the one or more new variables.

5. A computer readable medium comprising one or more processors and a memory coupled to the one or more processors, the memory storing instructions executed by the one or more processors, the one or more processors configured to:
   extract a plurality of data points from a data stream received from a plurality of equipment within an equipment category, wherein the data stream received from each of the plurality of equipment is uniformly translated before providing as input to an information extraction module;
   normalize, by a frequency decoupling module, a varying frequency of the plurality of extracted data points to generate time normalized information corresponding to each of the plurality of equipment in the equipment category;
   manipulate, by a variance handling module, a plurality of variances in the translated uniform data stream received from each of the plurality of equipment within the equipment category; and
   generically map, by a generalized mapping module, the time normalized information to one or more aggregation methods and for mapping an output of the one or more aggregation methods to one or more reusable data processing algorithms to generate a plurality of uniform equipment characteristics corresponding to the equipment category.

* * * * *